(12) United States Patent
Van Der Puy et al.

(10) Patent No.: US 10,077,330 B2
(45) Date of Patent: Sep. 18, 2018

(54) STORAGE STABLE FOAMABLE COMPOSITIONS CONTAINING 1,1,1,4,4,4-HEXAFLUORO-2-BUTENE

(71) Applicant: HONEYWELL INTERNATIONAL INC., Morristown, NJ (US)

(72) Inventors: Michael Van Der Puy, Amherst, NY (US); David J. Williams, East Amherst, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 7 days.

(21) Appl. No.: 14/771,981

(22) PCT Filed: Mar. 4, 2014

(86) PCT No.: PCT/US2014/020100
§ 371 (c)(1),
(2) Date: Sep. 1, 2015

(87) PCT Pub. No.: WO2014/137969
PCT Pub. Date: Sep. 12, 2014

(65) Prior Publication Data
US 2016/0009847 A1     Jan. 14, 2016

Related U.S. Application Data

(60) Provisional application No. 61/773,216, filed on Mar. 6, 2013.

(51) Int. Cl.
| | | |
|---|---|---|
| *C08G 18/32* | (2006.01) | |
| *C08G 18/18* | (2006.01) | |
| *C08G 18/48* | (2006.01) | |
| *C08J 9/02* | (2006.01) | |
| *C08J 9/14* | (2006.01) | |
| *C08G 18/08* | (2006.01) | |
| *C08G 101/00* | (2006.01) | |

(52) U.S. Cl.
CPC ......... *C08G 18/3206* (2013.01); *C08G 18/14* (2013.01); *C08G 18/1808* (2013.01); *C08G 18/4816* (2013.01); *C08J 9/02* (2013.01); *C08J 9/146* (2013.01); *C08G 2101/0008* (2013.01); *C08G 2101/0016* (2013.01); *C08G 2101/0025* (2013.01); *C08G 2105/02* (2013.01); *C08J 2201/022* (2013.01); *C08J 2203/162* (2013.01); *C08J 2375/04* (2013.01)

(58) Field of Classification Search
CPC ........................... C08G 18/3206; C08G 18/14; C08G 18/4816; C08G 18/1808; C08G 2101/0025; C08G 2105/02; C08G 2101/0016; C08G 2101/0008; C08J 9/02; C08J 9/146; C08J 2375/04; C08J 2203/162; C08J 2201/022
See application file for complete search history.

(56) References Cited

U.S. PATENT DOCUMENTS

| | | | | |
|---|---|---|---|---|
| 2012/0104307 A1* | 5/2012 | Bogdan | ................ | C08J 9/149 252/62 |
| 2012/0248371 A1* | 10/2012 | Ross | ................ | C08J 9/146 252/182.15 |
| 2012/0313035 A1* | 12/2012 | Williams | ........... | C08G 18/5021 252/182.24 |
| 2013/0041048 A1* | 2/2013 | Chen | ................. | C08G 18/4018 516/12 |

* cited by examiner

*Primary Examiner* — John M Cooney
(74) *Attorney, Agent, or Firm* — Colleen D. Szuch

(57) ABSTRACT

In certain non-limiting, aspects, the present invention relates to storage stable premixes of a polyol suitable for polyurethane or polyisocyanurate foam preparation having, at least, 1,1,1,4,4,4-hexafluoro-2-butene (1336mzzm) as the blowing agent and optional one or more additional additives and/or auxiliary blowing agents in amounts suitable for polyurethane or polyisocyanurate foam preparation.

9 Claims, No Drawings

STORAGE STABLE FOAMABLE COMPOSITIONS CONTAINING 1,1,1,4,4,4-HEXAFLUORO-2-BUTENE

CROSS REFERENCES TO RELATED APPLICATIONS

The present application claims priority to U.S. Provisional Application Ser. No. 61/773,216, filed Mar. 6, 2013, the contents of which are incorporated herein by reference in its entirety.

FIELD OF THE INVENTION

The present invention pertains to foams and methods for the preparation thereof, and in particular to storage stable foams and foamable compositions and methods for the preparation thereof.

BACKGROUND OF THE INVENTION

The class of foams known as low density, rigid to semi-rigid polyurethane or polyisocyanurate foams has utility in a wide variety of insulation applications, including roofing systems, building panels, building envelope insulation, spray applied foams, one and two component froth foams, insulation for refrigerators and freezers, and so called integral skin foam for cushioning and safety application such as steering wheels and other automotive or aerospace cabin parts, shoe soles, and amusement park ride restraints. An important factor in the large-scale commercial success of many rigid to semi-rigid polyurethane foams has been the ability of such foams to provide a good balance of properties. In general, rigid polyurethane and polyisocyanurate foams are known to provide outstanding thermal insulation, excellent fire resistance properties, and superior structural properties at reasonably low densities. Integral skin foams are known to produce a tough durable outer skin and a cellular, cushioning core.

As is known, blowing agents are used to form the cellular structure required for such foams. It has been common to use liquid fluorocarbon blowing agents because of their ease of use and ability to produce foams with superior mechanical and thermal insulation properties. Fluorocarbons not only act as blowing agents by virtue of their volatility, but also are encapsulated or entrained in the closed cell structure of the rigid foam and are generally the major contributor to the low thermal conductivity properties of the rigid urethane foams. The use of fluorocarbon as the preferred commercial expansion or blowing agent in insulating foam applications is based in part on the resulting k-factor associated with the foam produced. The k-factor provides a measure of the ability of the foam to resist the transfer of heat through the foam material. As the k-factor decreases, this is an indication that the material is more resistant to heat transfer and therefore a better foam for insulation purposes. Thus, materials that produce lower k-factor foams are desirable and advantageous.

It is known in the art to produce rigid or semi-rigid polyurethane and polyisocyanurate foams by reacting one or more polyisocyanate(s) with one or more polyol(s) in the presence of one or more blowing agent(s) one or more catalyst(s) and one or more surfactant(s). Water is commonly used as a blowing agent in such systems. Other blowing agents which have been used include hydrocarbons, fluorocarbons, chlorocarbons, chlorofluorocarbons, hydro-chlorofluorocarbons, halogenated hydrocarbons, ethers, esters, aldehydes, alcohols, ketones, organic acid or gas, most often $CO_2$, generating materials. Heat is generated when the polyisocyanate reacts with the polyol, and this heat tends to volatilize the blowing agent contained in the liquid mixture, thereby forming bubbles therein as the foaming reaction proceeds. In the case of gas generating materials, gaseous species are generated by thermal decomposition or reaction with one or more of the ingredients used to produce the polyurethane or polyisocyanurate foam. As the polymerization reaction proceeds, the liquid mixture becomes a cellular solid, entrapping the blowing agent in the cells as they are formed.

The purpose of the surfactant in the foamable composition is to help ensure the formation of a cellular structure that is conducive to good thermal insulation properties. The surfactant(s) tend to hold the blowing agent within the foam as the liquid foamable mixture solidifies and to thereby aid in the formation of smaller, more regular cells. If surfactant is not used in the foaming composition, the bubbles tend to simply pass through the liquid mixture without forming a foam or forming a foam with undesirably large, irregular cells.

In addition to the important performance characteristics mentioned above, it has become increasingly important for the blowing agent(s) used in foamable compositions to have low global warming potential. Previous applications illustrate the use of hydrohaloolefins (HFOs) as desirable blowing agents, particularly trans-1,3,3,3-tetrafluoropropene (HFO-1234ze(E)) and trans-1-chloro-3,3,3-trifluoropropene (HCFO-1233zd(E)). Processes for the manufacture of trans-1,3,3,3-tetrafluoropropene are disclosed in U.S. Pat. Nos. 7,230,146 and 7,189,884. Processes for the manufacture of trans-1-chloro-3,3,3-trifluoropropene are disclosed in U.S. Pat. Nos. 6,844,475 and 6,403,847.

It is convenient in many applications to provide the components for polyurethane or polyisocyanurate foams in pre-blended formulations. Most typically, the foam formulation is pre-blended into two components. The polyisocyanate and optionally isocyanate compatible raw materials, including but not limited to certain blowing agent(s) and non-reactive surfactant(s), comprise the first component, commonly referred to as the "A" component or "A side." A polyol or mixture of polyols, one or more surfactant(s), one or more catalyst(s), one or more blowing agent(s), and other optional component(s), including but not limited to flame retardants, colorants, compatibilizers, and solubilizers, comprise the second component, commonly referred to as the "B" component or "B side." Accordingly, polyurethane or polyisocyanurate foams are readily prepared by bringing together the A side and the B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and other polyols can be added to the mixing head or reaction site. Most conveniently, however, they are all incorporated into one B component.

SUMMARY OF THE INVENTION

While the above-mentioned hydrohaloolefins have many advantageous features and characteristics when used as blowing agents, applicants have come to recognize the existence of a potentially serious shortcoming of certain foam systems which utilize certain of such hydrohaloolefins. More particularly, applicants have found that a problem may arise with the long term stability, and hence the shelf life, of foamable systems in which hydrofluoroolefins, and in particular certain hydrofluoroolefins such as HFO-1234ze(E) and HFCO-1233zd(E), are used as the blowing agent.

As mentioned above, it has heretofore been common to place the blowing agent(s), the catalyst(s) and the surfactant(s) together in a B side of a foamable system. Applicants have found that hydrofluoroolefins, including particularly HFO-1234ze(E) and HFCO-1233zd(E), can decompose or react under certain conditions to a detrimental extent over time when in the presence of certain catalysts, including particularly amine-containing catalysts, that are commonly used in many B side formulations. Applicants have found that one such condition in which detrimental decomposition can occur is when water is present in the composition in amounts that have been heretofore typically used in such blowing agent systems.

Accordingly, applicants have come to appreciate that in certain situations and/or systems, particularly when water or another polar solvent is present as an additive in the system or the blowing agent composition, the long-term stability of the composition can decrease markedly and to a highly detrimental extent. Although applicants do not intend to be bound necessarily to a theory of operation, it is believed that the rate of the decomposition reaction is increased substantially when water is present in typical co-blowing agent amounts. Accordingly, the presence of added water, for example in amounts greater than about 1% by weight of the B side composition, tends to greatly exacerbate the stability problem which arises from the presence together of hydrofluoroolefin and catalyst-effective amounts of amine-containing catalysts.

Moreover, applicants have also found that the above-noted interaction between the hydrohaloolefins and the amine produces a negative effective on the performance of surfactants, including particularly silicone-containing surfactants, which are present in such compositions. Once again, although applicants do not intend to be bound by or to any particular theory of operation, it is believed that the decomposition reaction produces fluorine ions as a byproduct, and that exposure of surfactant compounds, particularly silicone-surfactant compounds, to such fluorine ions causes over time a degradation of the molecular weight of the surfactant, which in turn negatively effects the ability of the surfactant to promote proper cell formation.

Applicants have surprisingly and unexpectedly found, however, that 1,1,1,4,4,4-hexafluoro-2-butene (1336mzzm) does not decompose or otherwise experience the above noted interaction. Accordingly, and in one aspect of the present invention, applicants have developed storage stable foam forming compositions, systems, and methods that include, at least, 1,1,1,4,4,4-hexafluoro-2-butene (1336mzzm) as the blowing agent. In certain particular, but non-limiting, aspects, the present invention relates to storage stable premixes of a polyol suitable for polyurethane or polyisocyanurate foam preparation having, at least, 1,1,1,4,4,4-hexafluoro-2-butene (1336mzzm) as the blowing agent and optional one or more additional additives and/or auxiliary blowing agents in amounts suitable for polyurethane or polyisocyanurate foam preparation.

To this end, and a certain preferred aspects, the present invention relates to storage stable foamable compositions and foam premixes including, at least, 1,1,1,4,4,4-hexafluoro-2-butene (1336mzzm) as the blowing agent, one or more polyols, one or more surfactants, and a catalyst system.

According to further aspects, this invention relates to methods of forming rigid to semi-rigid, polyurethane and polyisocyanurate foams, which foams are characterized by a fine uniform cell structure and little or no foam collapse. The foams are preferably produced with an organic polyisocyanate and a polyol premix composition which comprises a combination of a blowing agent, which includes 1,1,1,4,4,4-hexafluoro-2-butene (1336mzzm), a polyol, a surfactant, and a catalyst system.

As used herein, the term "storage stable" or "storage stable premix" refers the substantial absence of any substantial deleterious effect on the reactivity characteristics of the foam ingredients after storage under ambient conditions for greater than one week, in certain aspects greater than two weeks, and in further aspects greater than one month. For purposes of this definition, "substantial deleterious effect on the reactivity characteristics of the foam ingredient" refers to decreasing the reactivity of the foam ingredients such that it produces at least a 10% increase in any of the following: cream time, gel time, and rise time.

As used herein, the term "cream time" means a measure of the beginning of the foam reaction between isocyanates and polyols. It is usually characterized by a change in the liquids color as it begins to rise. That is, it is measured from the mixing of the foam forming components until the mixture begins to change color. As used herein, the term "gel time" means the interval of time between mixing together the polyol and isocyanate, and the formation of a non-flowing, semi-solid, jelly like system. As used herein, the term "rise time" means the interval of time between mixing together the polyol and isocyanate, and the point where foam expansion ceases. Thus, it is meant to refer to the time period starting from mixing of the foam forming components and ending when the foam rising stops. Standards for each of the cream time, gel time, and rise time may be found in ASTM D7487, the contents of which are incorporated herein by reference.

Additional aspects, embodiments, and advantages of the invention will be readily apparent to one of skill in the art on the basis of the disclosure provided herein.

DETAILED DESCRIPTION OF PREFERRED EMBODIMENTS

Preferred aspects of the invention provide a storage stable polyol premix composition which comprises a combination of a blowing agent, one or more polyols, one or more silicone surfactants, and a catalyst, wherein the blowing agent comprises 1,1,1,4,4,4-hexafluoro-2-butene (1336mzzm), and optionally a hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, or combinations thereof.

Another preferred embodiment of the invention provides a method of preparing a polyurethane or polyisocyanurate foam comprising reacting an organic polyisocyanate with the polyol premix composition and optionally adding water as a third chemical component.

The present invention in certain aspects provides a blowing agent composition that comprises 1,1,1,4,4,4-hexafluoro-2-butene (1336mzzm). As used herein, the terms "1,1,1,4,4,4-hexafluoro-2-butene" or "1336mzzm" generically to refer to 1,1,1,4,4,4-hexafluoro-2-butene, independent of whether it is the cis- or trans-form. The terms "cis-1336mzzm" and "trans-1336mzzm" are used herein to describe the cis- and trans-forms of 1,1,1,4,4,4-hexafluoro-2-butene, respectively. The terms "1,1,1,4,4,4-hexafluoro-2-butene" or "1336mzzm" therefore include within its scope cis-1336mzzm, trans-1336mzzm, and all combinations and mixtures of these. In certain aspects, a blend of cis-1336mzzm and trans-1336mzzm may be provided in amounts of 1-99 wt. % cis-1336mzzm and 1-99 wt. % trans-1336 mzzm; in further aspects between about 10-90 wt. % cis-1336mzzm and 10-90 wt. % trans-1336 mzzm; in further embodiments 20-80 wt. % cis-1336mzzm and 20-80 wt. % trans-1336 mzzm.

The blowing agent composition may also include one or more additional or co-blowing agents, including at least one of a hydrocarbon, fluorocarbon, chlorocarbon, fluorochlorocarbon, halogenated hydrocarbon, ether, fluorinated ether, ester, alcohol, aldehyde, ketone, organic acid, gas generating material, or combinations thereof.

The preferred blowing agent compositions have a Global Warming Potential (GWP) of not greater than 150, more preferably not greater than 100 and even more preferably not greater than 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference. Preferred blowing agent compositions also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

Preferred optional blowing agents non-exclusively include water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (HCFC-124); 1,1-dichloro-1-fluoroethane (HCFC-141b); 1,1,1,2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); dichlorofluoromethane (HCFC-22); 1,1,1,3,3,3-hexafluoropropane (HFC-236fa); 1,1,1,2,3,3-hexafluoropropane (HFC-236e); 1,1,1,2,3,3,3-heptafluoropropane (HFC-227ea), difluoromethane (HFC-32); 1,1-difluoroethane (HFC-152a); 1,1,1,3,3-pentafluoropropane (HFC-245fa); butane; isobutane; normal pentane; isopentane; cyclopentane, 1,3,3,3-tetrafluoropropene (HFO-1234ze), 1-chloro-3,3,3-trifluoropropene (HCFO-1233zd) or combinations thereof. In certain embodiments the co-blowing agent(s) include one or a combination of water and/or normal pentane, isopentane or cyclopentane, which may be provided with 1,1,1,4,4,4-hexafluoro-2-butene (1336mzzm).

The blowing agent component is usually present in the polyol premix composition in an amount of from about 1 wt. % to about 30 wt. %, preferably from about 3 wt. % to about 25 wt. %, and more preferably from about 5 wt. % to about 25 wt. %, by weight of the polyol premix composition. When both 1,1,1,4,4,4-hexafluoro-2-butene (1336mzzm) and an optional blowing agent are present, 1,1,1,4,4,4-hexafluoro-2-butene (1336mzzm) component is preferably present in the blowing agent component in an amount of from about 5 wt. % to about 90 wt. %, preferably from about 7 wt. % to about 80 wt. %, and more preferably from about 10 wt. % to about 70 wt. %, by weight of the blowing agent component; and the optional blowing agent is usually present in the blowing agent component in an amount of from about 95 wt. % to about 10 wt. %, preferably from about 93 wt. % to about 20 wt. %, and more preferably from about 90 wt. % to about 30 wt. %, by weight of the blowing agent component.

The polyol component, which may include mixtures of polyols, can be any polyol which reacts in a known fashion with an isocyanate in preparing a polyurethane or polyisocyanurate foam. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b): (a) glycerine, ethylene glycol, diethylene glycol, trimethylolpropane, ethylene diamine, pentaerythritol, soy oil, lecithin, tall oil, palm oil, castor oil; (b) ethylene oxide, propylene oxide, a mixture of ethylene oxide and propylene oxide; or combinations thereof. The polyol component is preferably present in the polyol premix composition in an amount of from about 60 wt. % to about 95 wt. %, preferably from about 65 wt. % to about 95 wt. %, and more preferably from about 70 wt. % to about 90 wt. %, by weight of the polyol premix composition.

The polyol premix composition may also contain at least one silicone-containing surfactant. The silicone-containing surfactant is used to aid in the formation of foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise.

Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures. The preferred silicone surfactant comprises a polysiloxane polyoxyalkylene block co-polymer. Some representative silicone surfactants useful for this invention are Momentive's L-5130, L-5180, L-5340, L-5440, L-6100, L-6900, L-6980 and L-6988; Air Products DC-193, DC-197, DC-5582, and DC-5598; and B-8404, B-8407, B-8409 and B-8462 from Goldschmidt AG of Essen, Germany. Others are disclosed in U.S. Pat. Nos. 2,834,748; 2,917,480; 2,846,458 and 4,147,847. The silicone surfactant component may be present in the polyol premix composition in an amount of from about 0.5 wt. % to about 5.0 wt. %, preferably from about 1.0 wt. % to about 4.0 wt. %, and more preferably from about 1.5 wt. % to about 3.0 wt. %, by weight of the polyol premix composition.

The polyol premix composition may also (or alternatively) include a non-silicone surfactant, such as a non-silicone, non-ionic surfactant. Such may include oxyethylated alkylphenols, oxyethylated fatty alcohols, paraffin oils, castor oil esters, ricinoleic acid esters, turkey red oil, groundnut oil, paraffins, and fatty alcohols. A preferred non-silicone non-ionic surfactant is LK-443 which is commercially available from Air Products Corporation. When a non-silicone, non-ionic surfactant used, it is usually present in the polyol premix composition in an amount of from about 0.25 wt. % to about 3.0 wt. %, preferably from about 0.5 wt. % to about 2.5 wt. %, and more preferably from about 0.75 wt. % to about 2.0 wt. %, by weight of the polyol premix composition.

The inventive polyol premix composition preferably contains a catalyst or a catalyst system. In certain aspects, the catalyst system includes an amine catalyst. The amine catalyst may include any one or more compounds containing an amino group and exhibiting the catalytic activity provided herein. Such compounds may be straight chain or cyclic non-aromatic or aromatic in nature. Useful, in certain aspects of the present invention, are primary amine, secondary amine or tertiary amine catalysts. Useful tertiary amine catalysts non-exclusively include N,N,N',N",N"-pentamethyldiethyltriamine (Polycat 5—Air Products and Chemicals, Inc.), N,N-dicyclohexylmethylamine; N,N-ethyldiisopropylamine; N,N-dimethylcyclohexylamine; N,N-dimethylisopropylamine; N-methyl-N-isopropylbenzylamine; N-methyl-N-cyclopentylbenzylamine; N-isopropyl-N-sec-butyl-trifluoroethylamine; N,N-diethyl-(α-phenylethyl) amine, N,N,N-tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-(α-phenylethyl)amine; or combinations thereof. Useful primary amine catalysts non-exclusively include: triphenylmethylamine and 1,1-diethyl-n-propylamine.

Other useful amines includes morpholines, imidazoles, ether containing compounds, and the like. These include
dimorpholinodiethylether
N-ethylmorpholine
N-methylmorpholine
bis(dimethylaminoethyl) ether
imidizole
n-methylimidazole
1,2-dimethylimidazole
dimorpholinodimethylether
N,N,N',N',N",N"-pentamethyldiethylenetriamine
N,N,N',N',N",N"-pentaethyldiethylenetriamine
N,N,N',N',N",N"-pentamethyldipropylenetriamine
bis(diethylaminoethyl) ether
bis(dimethylaminopropyl) ether.

In certain preferred embodiments the amine catalyst(s) are present in the polyol premix composition in an amount of from about 0.001 wt. % to about 5.0 wt. %, 0.01 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of the foregoing catalyst can vary widely, and the appropriate amount can be easily be determined by those skilled in the art.

In addition to (or in certain embodiments in place of) an amine catalyst, the catalyst system of the present invention also includes at least one non-amine catalyst. In certain embodiments, the non-amine catalysts are inorgano- or organo-metallic compounds. Useful inorgano- or organo-metallic compounds include, but are not limited to, organic salts, Lewis acid halides, or the like, of any metal, including, but not limited to, transition metals, post-transition (poor) metals, rare earth metals (e.g. lanthanides), metalloids, alkali metals, alkaline earth metals, or the like. According to certain broad aspects of the present invention, the metals may include, but are not limited to, bismuth, lead, tin, zinc, chromium, cobalt, copper, iron, manganese, magnesium, potassium, sodium, titanium, mercury, zinc, antimony, uranium, cadmium, thorium, aluminum, nickel, cerium, molybdenum, vanadium, zirconium, or combinations thereof. Non-exclusive examples of such inorgano- or organo-metallic catalysts include, but are not limited to, bismuth nitrate, lead 2-ethylhexoate, lead benzoate, lead naphthanate, ferric chloride, antimony trichloride, antimony glycolate, tin salts of carboxylic acids, dialkyl tin salts of carboxylic acids, potassium acetate, potassium octoate, potassium 2-ethylhexoate, potassium salts of carboxylic acids, zinc salts of carboxylic acids, zinc 2-ethylhexanoate, glycine salts, alkali metal carboxylic acid salts, sodium N-(2-hydroxy-5-nonylphenol)methyl-N-methylglycinate, tin (II) 2-ethylhexanoate, dibutyltin dilaurate, or combinations thereof. In certain preferred embodiments the catalysts are present in the polyol premix composition in an amount of from about 0.001 wt. % to about 5.0 wt. %, 0.01 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of the foregoing catalyst can vary widely, and the appropriate amount can be easily be determined by those skilled in the art.

In another embodiment of the invention, the non-amine catalyst is a quaternary ammonium carboxylate. Useful quaternary ammonium carboxylates include, but are not limited to: (2-hydroxypropyl)trimethylammonium 2-ethylhexanoate (TMR® sold by Air Products and Chemicals) and (2-hydroxypropyl)trimethylammonium formate (TMR-2® sold by Air Products and Chemicals). These quaternary ammonium carboxylate catalysts are usually present in the polyol premix composition in an amount of from about 0.25 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of catalyst can vary widely, and the appropriate amount can be easily be determined by those skilled in the art.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials, including but not limited to blowing agents and certain silicone surfactants, comprise the first component, commonly referred to as the "A" component. The polyol mixture composition, including surfactant, catalysts, blowing agents, and optional other ingredients comprise the second component, commonly referred to as the "B" component. In any given application, the "B" component may not contain all the above listed components, for example some formulations omit the flame retardant if flame retardancy is not a required foam property. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all, with the exception of water, incorporated into one B component as described above.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124.605; and 3,201,372. Preferred as a class are the aromatic polyisocyanates.

Representative organic polyisocyanates correspond to the formula:

$$R(NCO)_z$$

wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluene-diisocyanate, dianisidine diisocyanate, bitoylene isocyanate, naphthylene 1,4-diisocyanate, bis(4-isocyanatophenyl) methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis (phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis(phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and N-(2-hydroxy-5-nonylphenol)methyl-N-methylglycinate.

Conventional flame retardants can also be incorporated, preferably in amount of not more than about 20 percent by weight of the reactants. Optional flame retardants include tris(2-chloroethyl)phosphate, tris(2-chloropropyl)phosphate, tris(2,3-dibromopropyl)phosphate, tris(1,3-dichloropropyl)phosphate, tri(2-chloroisopropyl)phosphate, tricresyl phosphate, tri(2,2-dichloroisopropyl)phosphate, diethyl N,N-bis(2-hydroxyethyl) aminomethylphosphonate, dimethyl methylphosphonate, tri(2,3-dibromopropyl)phosphate, tri(1,3-dichloropropyl)phosphate, and tetra-kis-(2-chloroethyl)ethylene diphosphate, triethylphosphate, diammonium phosphate, various halogenated aromatic compounds, antimony oxide, aluminum trihydrate, polyvinyl chloride, melamine, and the like. Other optional ingredients can include from 0 to about 7 percent water, which chemically reacts with the isocyanate to produce carbon dioxide. This carbon dioxide acts as an auxiliary blowing agent. In the case of this invention, the water cannot be added to the polyol blend but, if used, can be added as a separate chemical stream. Formic acid is also used to produce carbon dioxide by reacting with the isocyanate and is optionally added to the "B" component.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The following non-limiting examples serve to illustrate the invention.

EXAMPLES

Example 1 (Comparative Example)

All polyol blends were prepared according the formulation in Table 1, below. Initial reactivity was recorded by reacting the polyol blend (50° F.) with equal weight of isocyanate Lupranate M20S (70° F.), resulting in an index of 107. To accelerate the aging process, the polyol blends were were loaded into a Fisher Porter tube and heated in an oven at 54° C. (130° F.) for 14 days. Tubes were evaluated at 62 hours, 5 days, 7 days, and 14 days for the presence of stability and results are provided below in Table 2.

TABLE 1

| Formulation | |
| --- | --- |
| VORANOL ® 490-polyol | 50 |
| VORANOL ® 270-polyol | 50 |
| Niax L6900 | 1.5 |
| Polycat 5 -catalyst | 1.2 |
| Water | 1.5 |
| 1233zd(E) | 8 |
| Total | 112.2 |

Example 2 (Foam Test)

All polyol blends were prepared according the formulation in Table 3, below. Initial reactivity was recorded by reacting the polyol blend (50° F.) with equal weight of isocyanate Lupranate M20S (70° F.), resulting in an index of 107. To accelerate the aging process, the polyol blends were loaded into a Fisher Porter tube and heated in an oven at 54° C. (130° F.) for 19 days. Tubes were evaluated at 7, 9, 12, 14, and 19 days for the presence of stability and results are provided below in Table 4.

TABLE 3

| Formulation | |
| --- | --- |
| VORANOL ® 490-polyol | 50 |
| VORANOL ® 270-polyol | 50 |
| Niax L6900 | 1.5 |
| Polycat 5 -catalyst | 1.2 |
| Water | 1.5 |
| 1336mzzm | 8 |
| Total | 112.2 |

TABLE 2

| Sample | Generic polyol Std.- initial | Generic polyol Std.- Aged 62 hr@ 130 F. | Generic polyol Std.- Aged 5 days@ 130 F. | Generic polyol Std.- Aged 7 days@ 130 F. | Generic polyol Std.- Aged 14 days@ 130 F. |
| --- | --- | --- | --- | --- | --- |
| Voranol 490-polyol | 50 | 50 | 50 | 50 | 50 |
| Voranol 270-polyol | 50 | 50 | 50 | 50 | 50 |
| Water | 1.5 | 1.5 | 1.5 | 1.5 | 1.5 |
| Niax L6900 | 1.5 | 1.5 | 1.5 | 1.5 | 1.5 |
| Polycat 5- catalyst | 1.2 | 1.2 | 1.2 | 1.2 | 1.2 |
| 1233zd(E) | 8 | 8 | 8 | 8 | 8 |
| TOTAL B | 112.2 | 112.2 | 112.2 | 112.2 | 112.2 |
| M20S Iso (110 Index) | 120 | 120 | 120 | 120 | 120 |
| POLY/ISO TEMP | 50/70 | 50/70 | 50/70 | 50/70 | 50/70 |
| Reactivity - cream/gel/tack free - in seconds | im*/95/184 | im*/125/247 | im*/135/275 | im*/145/340 | NA** |
| Pressure tube loading (70 g)poly/BA | 65/5 | 65/5 | 65/5 | 65/5 | 65/5 |
| COMMENTS | Generic polyol Std.- Initial. Polyol was very pale clear yellow. Foam was normal with no cell collapse and fine cell structure. | Generic polyol Std.- aged 62 hours. Polyol color was darker clear yellow. Foam was normal with no cell collapse and fine cell structure. | Generic polyol Std.- aged 5 days. Polyol color was darker clear yellow. Foam was normal with no cell collapse and fine cell structure. | Generic polyol Std.- aged 7 days. Polyol color was dark clear yellow. Foam showed slight coalescence. and a slightly courser cell structure. Guess of 30-50% cell collapse | Generic polyol Std.- aged 14 days. Polyol color was dark clear yellow. Foam showed 100% collapse. | im*—immediate
NA**—no measurements made because foam collapsed completely

TABLE 4

| Sample | Generic polyol 1336- Initial | Generic polyol 1336- 7 days 130° F. | Generic polyol 1336- 9 days 130° F. | Generic polyol 1336- 12 days 130° F. | Generic polyol 1336- 14 days 130° F. | Generic polyol 1336- 19 days 130° F. |
|---|---|---|---|---|---|---|
| Voranol 490-polyol | 50 | 50 | 50 | 50 | 50 | 50 |
| Voranol 270-polyol | 50 | 50 | 50 | 50 | 50 | 50 |
| Water | 1.5 | 1.5 | 1.5 | 1.5 | 1.5 | 1.5 |
| Niax L6900 | 1.5 | 1.5 | 1.5 | 1.5 | 1.5 | 1.5 |
| Polycat 5- catalyst | 1.2 | 1.2 | 1.2 | 1.2 | 1.2 | 1.2 |
| 1336mzzm | 8 | 8 | 8 | 8 | 8 | 8 |
| TOTAL B | 112.2 | 112.2 | 112.2 | 112.2 | 112.2 | 112.2 |
| M20S Iso (110 Index) | 120 | 120 | 120 | 120 | 120 | 120 |
| POLY/ISO TEMP | 50/70 | 50/70 | 50/70 | 50/70 | 50/70 | 50/70 |
| Reactivity - cream/gel/tack free - in seconds | im*/85/120 | im*/87/128 | im*/87/131 | im*/105/165 | im*/103/164 | im*/102/159 |
| Pressure tube loading (70 g)poly/BA | 70 | 70 | 70 | 70 | 70 | 70 |
| NOTE -zd (E) in the same experiment gave 50% cell collapse and significant reactivity shift after 7 days | polyol clear pale yellow color. Foam normal fine cell | polyol clear pale yellow color; equal to initial. Foam is normal fine cell equal to initial | polyol clear pale yellow color, equal to initial. Foam is normal fine cell equal to initial | polyol clear pale yellow color, very slightly darker than initial. Foam is normal fine cell equal to initial | polyol clear pale yellow color very slightly darker than initial. Color is equal to 12 day color. Foam is normal fine cell equal to initial. | polyol clear pale yellow color very slightly darker than initial. Color is equal to 12 day color. Foam is normal fine cell equal to initial. | im*—immediate

As indicated above in Table 2 & 4, resin containing 1223zd (E) immediately became darker as soon as the aging experiments started and the pale yellow of the fresh resin became dark yellow after 7 days heating. On the contrary, the resin containing 1336mzzm remained basically the pale yellow during the aging test (very slightly darker after 12 days heating, and no further change was observed thereafter).

The gel time for the resin containing 1233zd(E) increased more than 30% after 62 hours aging. When the resin was heated at 130° F. for 7 days, the foaming reaction became much slower with more than 50% gel time increase. After two weeks aging, the foaming reaction became so slow that the foam collapsed completely. While the resin containing 1336mzzm maintained the same reactivity even after 9 days accelerated aging. The gel time only increase about 20% after 12 days heating, and did not increase further even the aging test continued.

The much more stable system containing 1336mzzm was further proved by foam cell structure. Though the gel time did increase slightly between 9 and 12 days, it appears to have stabilized after that and was maintained within commercially acceptable levels. All foams displayed fine cell structure even the resin was accelerated aged. No coarsed cell or collapsed like the case of 1233zd(E) was observed.

What is claimed is:

1. A method of forming a foam comprising;
    (a) forming at a first point in time a storage stable premix for foam manufacture, said storage stable premix composition comprising: (i) from about 5% to about 25% by weight of a blowing agent composition comprising, based on the components in the blowing agent composition, from about 7% to about 80% by weight of 1,1,1,4,4,4-hexafluoro-2-butene (1336mzzm) and from about 10% to about 95% by weight of water, (ii) from about 60% to about 95% by weight of one or more polyols, (iii) from about 0.5% to about 5% by weight of one or more surfactants, and (iv) from about 0.25% to about 3% by weight of N,N,N',N",N"-pentamethyldiethyltriamine as a tertiary amine catalyst;
    (b) forming a foam from said storage stable premix at a second point in time at least 7 days after said first point in time, wherein said premix is formed under conditions effective to ensure that substantially no reaction occurs between said blowing agent and said N,N,N', N",N"-pentamethyldiethyltriamine catalyst for said at least said 7 days, wherein said said premix composition does not contain 1-chloro-3,3,3-trifluoropropene (HCFO-1233zd).

2. The method of claim 1, wherein the blowing agent further comprises a co-blowing agent selected from the group consisting of hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, and combinations thereof.

3. The method of claim 2, wherein the co-blowing agent is selected from the group consisting of 1,3,3,3-tetrafluoropropene, organic acids that produce CO2 and/or CO, a pentane, a butane, methylal, methyl formate, 1,1,1,3,3-pentafluorobutane (HFC-365mfc); 1,1,1,2,3,3,3-heptafluoropropane (HFC-227ea), 1,1,1,3,3-pentafluoropropane (HFC-245fa); trans-1,2-dichloroethylene; 1,1-difluoroethane (HFC-152a); and combinations thereof.

4. The method of claim 1, wherein said premix composition further comprises a non-amine catalyst.

5. The method of claim 1, wherein said surfactant comprises a silicone surfactant.

6. The method of claim 1, wherein the foam is formed from said storage stable premix at a second point in time at least 14 days after said first point in time, wherein said premix is formed under conditions effective to ensure that substantially no reaction occurs between said 1,1,1,4,4,4-hexafluoro-2-butene (1336mzzm) and said N,N,N',N",N"-pentamethyldiethyltriamine catalyst for said at least said 14 days.

7. The method of claim 1, wherein the foam is formed from said storage stable premix at a second point in time at least 30 days after said first point in time, wherein said premix is formed under conditions effective to ensure that substantially no reaction occurs between said 1,1,1,4,4,4-hexafluoro-2-butene (1336mzzm) and said N,N,N',N",N"-pentamethyldiethyltriamine catalyst for said at least said 30 days.

8. A method of forming a foam comprising;
(a) forming at a first point in time a storage stable premix for foam manufacture, said storage stable premix composition comprising: (i) from about 5% to about 25% by weight a blowing agent composition comprising, based on the components in the blowing agent composition, from about 7% to about 80% by weight of 1,1,1,4,4,4-hexafluoro-2-butene (1336mzzm) and from about 10% to about 95% by weight of water, (ii) from about 60% to about 95% by weight of one or more polyols, (iii) from about 0.5% to about 5% by weight of one or more surfactants, and (iv) from about 0.25% to about 3% by weight of N,N,N',N",N"-pentamethyldiethyltriamine as a tertiary amine catalyst;
(b) forming a foam from said storage stable premix at a second point in time at least 7 days after said first point in time, wherein said premix is formed under conditions effective to ensure that substantially no reaction occurs between said blowing agent and said N,N,N',N",N"-pentamethyldiethyltriamine catalyst during said 7 days, wherein said premix composition does not contain 1-chloro-3,3,3-trifluoropropene (HCFO-1233zd).

9. The method of claim 8, further comprising a co-blowing agent that is selected from the group consisting of 1,3,3,3-tetrafluoropropene, organic acids that produce CO2 and/or CO, a pentane, a butane, methylal, methyl formate, 1,1,1,3,3-pentafluorobutane (HFC-365mfc); 1,1,1,2,3,3,3-heptafluoropropane (HFC-227ca), 1,1,1,3,3-pentafluoropropane (HFC-245 fa); trans-1,2-dichloroethylene; 1,1-difluoroethane (HFC-152a); and combinations thereof.

* * * * *